United States Patent
Hirano

(10) Patent No.: US 12,485,387 B2
(45) Date of Patent: Dec. 2, 2025

(54) FILM CLEANING SOLUTION AND METHOD FOR CLEANING FILM

(71) Applicant: TOKYO OHKA KOGYO CO., LTD., Kanagawa (JP)

(72) Inventor: Isao Hirano, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 0 days.

(21) Appl. No.: 18/252,770

(22) PCT Filed: Nov. 17, 2021

(86) PCT No.: PCT/JP2021/042185
§ 371 (c)(1),
(2) Date: May 12, 2023

(87) PCT Pub. No.: WO2022/107795
PCT Pub. Date: May 27, 2022

(65) Prior Publication Data
US 2024/0001305 A1    Jan. 4, 2024

(30) Foreign Application Priority Data
Nov. 17, 2020   (JP) ................ 2020-190859

(51) Int. Cl.
| | |
|---|---|
| C11D 7/00 | (2006.01) |
| B01D 65/06 | (2006.01) |
| B01D 71/26 | (2006.01) |
| B01D 71/64 | (2006.01) |
| C11D 7/26 | (2006.01) |
| C11D 7/50 | (2006.01) |

(52) U.S. Cl.
CPC ......... B01D 65/06 (2013.01); B01D 71/261 (2022.08); B01D 71/64 (2013.01); C11D 7/265 (2013.01); C11D 7/50 (2013.01)

(58) Field of Classification Search
CPC .................................................. C11D 7/265
See application file for complete search history.

(56) References Cited

U.S. PATENT DOCUMENTS

| | | | |
|---|---|---|---|
| 2006/0138399 A1* | 6/2006 | Itano | G03F 7/42 257/E21.255 |
| 2007/0015680 A1 | 1/2007 | Kawakatsu et al. | |
| 2010/0242999 A1 | 9/2010 | Quillen et al. | |
| 2013/0141501 A1 | 6/2013 | Iida et al. | |
| 2015/0299626 A1* | 10/2015 | Kamo | H05K 3/26 134/61 |
| 2017/0321168 A1 | 11/2017 | Hirano | |
| 2018/0257038 A1 | 9/2018 | Ishii et al. | |

FOREIGN PATENT DOCUMENTS

| | | |
|---|---|---|
| CN | 1524607 A | 9/2004 |
| JP | S55-129106 A | 10/1980 |
| JP | S60-204898 A | 10/1985 |
| JP | 2006-159062 A | 6/2006 |
| JP | 2017-023976 A | 2/2017 |
| JP | 2017-202479 A | 11/2017 |
| JP | 2018-122206 A | 8/2018 |
| TW | 201706035 A | 2/2017 |
| WO | 2004/076040 A1 | 9/2004 |
| WO | 2018047631 A1 | 3/2018 |
| WO | 2020-009207 A1 | 1/2020 |
| WO | 2020021721 A1 | 1/2020 |

OTHER PUBLICATIONS

Hiroshi Yamamoto, et al., "Consideration of Hansen Solubility Parameters", Part 1., Hansen Solubility Parameters 50th anniversary conference. 2017, pp. 1-13.
Hiroshi Yamamoto, et al., "Consideration of Hansen Solubility Parameters", Part 3., Hansen Solubility Parameters 50th anniversary conference. 2017, pp. 22-36.
International Search Report dated Jan. 25, 2022 issued in PCT/JP2021/042185.

* cited by examiner

Primary Examiner — Necholus Ogden, Jr.
(74) Attorney, Agent, or Firm — Rankin, Hill & Clark LLP

(57) ABSTRACT

A film cleaning solution that contains a solvent and a metal removing agent, in which two or more kinds of the solvents are contained, and a distance between a Hansen solubility parameter of the film cleaning solution and a Hansen solubility parameter of dimethylacetamide is 1.0 or less.

10 Claims, No Drawings

FILM CLEANING SOLUTION AND METHOD FOR CLEANING FILM

TECHNICAL FIELD

The present invention relates to a film cleaning solution and a method for cleaning a film.

Priority is claimed on Japanese Patent Application No. 2020-190859, filed Nov. 17, 2020, the content of which is incorporated herein by reference.

BACKGROUND ART

In the related art, various films have been used for applications such as filters.

Various cleaning solutions are selected for cleaning the films depending on the type of contamination.

For the removal of the contamination of the films, for example, metal impurities, an acid such as hydrochloric acid is commonly used to wash the films. For organic stains, a cleaning solution containing a solvent capable of removing the organic matter is selected.

For example, it is disclosed in Patent Document 1 that a cleaning solution for a polyimide-based resin film cleans stains (organic residue) derived from a material of the film, and the cleaning solution contains at least one solvent selected from the group consisting of hydroxyaliphatic carboxylic acid ester, aliphatic carboxylic acid ester, chain or cyclic ketone, alkylene glycol monoalkyl ether, and alkylene glycol monoalkyl ether acetate, and an aprotic polar solvent other than these solvents.

CITATION LIST

Patent Document

[Patent Document 1]
Japanese Unexamined Patent Application, First Publication No. 2017-202479

SUMMARY OF INVENTION

Technical Problem

As with the polyimide-based resin film cleaning solution disclosed in Patent Document 1, in a case of cleaning organic residues derived from a material of the film, it is common to use a different cleaning solution for a film depending on a material of the film.

For example, a film made of a polar resin such as polyimide is generally washed with a cleaning solution containing a polar solvent such as dimethylacetamide (DMAc). In contrast, a film made of a non-polar resin such as polyethylene is generally washed with a cleaning solution containing a non-polar solvent such as a hydrocarbon-based solvent.

On the other hand, as demands for films, which are objects to be cleaned, are increasing, the cleaning performance required for film cleaning solutions is also increasing.

Specifically, there is a demand for a film cleaning solution that can clean organic residues derived from film materials and metal impurities derived from metal catalysts used during synthesis of resins, regardless of film materials. Furthermore, regarding the metal impurities, a film cleaning solution that has high removability for calcium causing clogging of films, is required.

An object of the present invention is to provide a film cleaning solution and a method for cleaning a film capable of removing both organic residues and metal impurities regardless of a material of the film.

Solution to Problem

In order to solve the above problems, the present inventors focused on Hansen solubility parameter of the film cleaning solution and a metal removing agent, and conducted extensive research. As a result, the present inventors have found that the favorable cleanability for not only the polyimide-based film but also a polyethylene-based film, whose properties are significantly different from those of the polyimide-based film has been achieved by allowing the metal removing agent to be contained while the Hansen solubility parameter of the film cleaning solution is made close to Hansen solubility parameter of DMAc, which was commonly used to clean a polyimide-based film, and the present inventors have completed the present invention. More specifically, the present invention employs the following aspects.

A first aspect of the present invention is a film cleaning solution that contains a solvent and a metal removing agent, in which two or more kinds of the solvents are contained, and a distance between a Hansen solubility parameter of the film cleaning solution and a Hansen solubility parameter of dimethylacetamide (hereinafter, simply referred to as a "HSP distance") is 1.0 or less.

A second aspect of the present invention is a method for cleaning a film, in which the film cleaning solution according to the first aspect is brought into contact with a film to clean the film.

Advantageous Effects of Invention

According to the present invention, it is possible to provide the film cleaning solution and the method for cleaning a film that can remove both organic residues and metal impurities regardless of a material of the film.

DESCRIPTION OF EMBODIMENTS (Film Cleaning Solution)

A film cleaning solution according to the present embodiment contains two or more kinds of solvents and a metal removing agent.

<Solvent>

The film cleaning solution according to the present embodiment contains two or more kinds of the solvents.

The solvent can be appropriately selected from known organic solvents so that HSP distance in the film cleaning solution according to the present embodiment is 1.0 or less. Specific examples of the solvent include polar solvents such as ketone-based solvents, ester-based solvents, alcohol-based solvents, nitrile-based solvents, amide-based solvents, ether-based solvents, sulfoxide-based solvents, and sulfone-based solvents; and non-polar solvents such as hydrocarbon-based solvents.

Among the organic solvents, as will be described later, organic solvents that contain a plurality of functional groups characterizing the above solvents in their structures are also present, and this case corresponds to any kinds of the solvents containing functional groups that the organic solvent have. For example, diethylene glycol monomethyl ether corresponds to both alcohol-based solvents and ether-based solvents in the above classification.

<<Ketone-Based Solvents>>

The ketone-based solvents are organic solvents containing C—C(=O)—C in their structure.

Specific examples of the ketone-based solvents include 1-octanone, 2-octanone, 1-nonanone, 2-nonanone, acetone, 4-heptanone, 1-hexanone, 2-hexanone, diisobutyl ketone, phenylacetone, methyl ethyl ketone, methyl isobutyl ketone, acetylacetone, acetonylacetone, ionone, diacetonyl alcohol, acetylcarbinol, acetophenone, methyl naphthyl ketone, methyl amyl ketone(2-heptanone), and the like.

The ketone-based solvents may also be cyclic ketone-based solvents. Specific examples of the cyclic ketone-based solvents include cyclohexanone (CH), methylcyclohexanone, isophorone, propylene carbonate, ethylene carbonate, dihydrolevoglucosenone (silene), and the like.

<<Ester-Based Solvents>>

The ester-based solvents are organic solvents containing C—C(=O)—O—C in their structure.

Specific examples of the ester-based solvents include methyl acetate, butyl acetate, ethyl acetate, isopropyl acetate, amyl acetate, isoamyl acetate, ethyl methoxyacetate, ethyl ethoxyacetate, ethylene glycol monoethyl ether acetate, ethylene glycol monopropyl ether acetate, ethylene glycol monobutyl ether acetate, ethylene glycol monophenyl ether acetate, diethylene glycol monomethyl ether acetate, diethylene glycol monopropyl ether acetate, diethylene glycol monophenyl ether acetate, diethylene glycol monobutyl ether acetate, diethylene glycol monoethyl ether acetate, 2-methoxybutyl acetate, 3-methoxybutyl acetate, 4-methoxybutyl acetate, 3-methyl-3-methoxybutyl acetate, 3-ethyl-3-methoxybutyl acetate, propylene glycol monomethyl ether acetate (PGMEA), propylene glycol monoethyl ether acetate, propylene glycol monopropyl ether acetate, 2-ethoxybutyl acetate, 4-ethoxybutyl acetate, 4-propoxybutyl acetate, 2-methoxypentyl acetate, 3-methoxypentyl acetate, 4-methoxypentyl acetate, 2-methyl-3-methoxypentyl acetate, 3-methyl-3-methoxypentyl acetate, 3-methyl-4-methoxypentyl acetate, 4-methyl-4-methoxypentyl acetate, propylene glycol diacetate, methyl formate, ethyl formate, butyl formate, propyl formate, ethyl lactate, butyl lactate, propyl lactate, ethyl carbonate, propyl carbonate, butyl carbonate, methyl pyruvate, ethyl pyruvate, propyl pyruvate, butyl pyruvate, methyl acetoacetate, ethyl acetoacetate, methyl propionate, ethyl propionate, propyl propionate, isopropyl propionate, methyl 2-hydroxypropionate, ethyl 2-hydroxypropionate, methyl-3-methoxypropionate, ethyl-3-methoxypropionate, ethyl-3-ethoxypropionate, propyl-3-methoxypropionate, and the like.

In addition, the ester-based solvents may be cyclic ester-based solvents (lactone-based solvents). Specific examples of the lactone-based solvents include γ-butyrolactone (GBL), ε-caprolactone, γ-valerolactone, δ-valerolactone, and the like.

<<Alcohol-Based Solvents>>

The alcohol-based solvents are organic solvents that contain alcoholic hydroxy groups in their structure.

The "alcoholic hydroxy group" means a hydroxy group bonded to a carbon atom of an aliphatic hydrocarbon group.

Specific examples of the alcohol-based solvents include 2-propanol (isopropyl alcohol), 1-butanol (n-butanol), 1-hexanol, 1-heptanol, 1-octanol, 2-hexanol, 2-heptanol, 2-octanol, 3-hexanol, 3-heptanol, 3-octanol, 4-octanol, benzyl alcohol, ethylene glycol, diethylene glycol, propylene glycol (PG), dipropylene glycol, and the like.

<<Nitrile-Based Solvents>>

The nitrile-based solvents are organic solvents that contain nitrile groups in their structure.

Specific examples of the nitrile-based solvents include acetonitrile, propionitrile, valeronitrile, butyronitrile, and the like.

<<Amide-Based Solvents>>

The amide-based solvents are organic solvents that contain amide groups in their structure.

Specific examples of the amide-based solvents include chain amide-based solvents such as dimethylacetamide (DMAc), dimethylformamide, tetramethylurea; and cyclic amide (lactam)-based solvents such as dimethylimidazolidinone, N-methylpyrrolidone, 1-ethyl-2-pyrrolidone, 1-butyl-2-pyrrolidone; and the like.

<<Ether-Based Solvents>>

The ether-based solvents are organic solvents containing C—O—C in their structure.

Specific examples of the ether-based solvents include ethylene glycol monomethyl ether (EGME), ethylene glycol isopropyl ether, ethylene glycol monobutyl ether, ethylene glycol monohexyl ether, propylene glycol monomethyl ether (PGME), propylene glycol monoethyl ether (PGEE), propylene glycol monopropyl ether, propylene glycol monobutyl ether, diisopropyl glycol monomethyl ether, and the like.

<<Sulfoxide-Based Solvents>>

The sulfoxide-based solvents are organic solvents that contain sulfinyl groups, —S(=O)—, in their structure.

Specific examples of the sulfoxide-based solvents include dimethylsulfoxide (DMSO) and the like.

<<Sulfone-Based Solvents>>

The sulfone-based solvents are organic solvents that contain sulfonyl groups, —S(=O)$_2$—, in their structure.

Specific examples of the sulfone-based solvents include sulfolane and the like.

<<Hydrocarbon-Based Solvents>>

The hydrocarbon-based solvents consist of optionally halogenated hydrocarbons and have no substituents other than halogen atoms. Examples of the halogen atoms include a fluorine atom, a chlorine atom, a bromine atom, an iodine atom, and the like, and a fluorine atom is preferable.

Specific examples of the hydrocarbon-based solvents include n-nonane, n-decane, n-undecane, n-dodecane, n-tridecane, n-tetradecane, n-pentadecane, n-hexadecane, and the like.

As the two or more kinds of the solvents in the film cleaning solution according to the present embodiment, among the above, a mixed solvent of two or more kinds of solvents selected from the group consisting of the ketone-based solvents, ester-based solvents, alcohol-based solvents, and ether-based solvents is preferable.

In the present specification, the two or more kinds of the solvents may contain two kinds of compounds, and may be two or more kinds of solvents belonging to the same classification. That is, the two or more kinds of the solvents may be a mixed solvent composed of 1-octanone and cyclohexanone, both of which are classified as the ketone-based solvents.

<Metal Removing Agent>

Specific examples of the metal removing agent in the film cleaning solution according to the present embodiment include metal chelating agents, organic acids, and the like.

<<Metal Chelating Agent>>

Specific examples of the metal chelating agents in the film cleaning solution according to the present embodiment include aminocarboxylic acid-based chelating agents such as ethylenediaminetetraacetic acid, nitrilotriacetic acid, and diethylenetriaminepentaacetic acid; phosphonic acid-based chelating agents such as 1-hydroxyethane-1,1-diphosphonic acid, nitrilotris(methylenephosphonic acid); a compound (A1) represented by the following General Formula (a-1) (hereinafter, also simply referred to as a "compound (A1)"); and the like.

Among the above, the compound (A1) represented by General Formula (a-1) is preferable as the metal chelating agents in the present embodiment.

Compound (A1)

The compound (A1) in the film cleaning solution according to the present embodiment is a compound represented by General Formula (a-1).

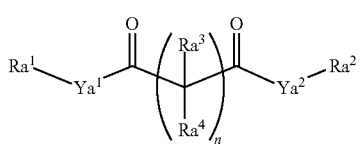

(a-1)

[In the formula, $Ra^1$ and $Ra^2$ are each independently an alkyl group having 1 to 3 carbon atoms. $Ra^3$ and $Ra^4$ are each independently a hydrogen atom or an alkyl group having 1 to 3 carbon atoms. $Ya^1$ and $Ya^2$ are each independently a single bond, —O—, —S—, or —N($Ra^5$)—. $Ra^5$ is a hydrogen atom or an alkyl group having 1 to 3 carbon atoms. n is an integer of 0 to 3.]

In Formula (a-1), examples of the alkyl group having 1 to 3 carbon atoms represented by $Ra^1$ to $Ra^5$ include a methyl group, an ethyl group, a propyl group, and an isopropyl group.

In Formula (a-1), $Ra^1$ and $Ra^2$ are each independently preferably a methyl group or an ethyl group, and more preferably a methyl group.

$Ra^3$ and $Ra^4$ are each preferably a hydrogen atom.

$Ya^1$ is preferably a single bond or —O—, and more preferably a single bond.

$Ya^2$ is preferably a single bond or —O—, and more preferably a single bond.

n is preferably 1 or 2, and more preferably 1.

Among the above, the compound (A1) is preferably acetylacetone (AcAc).

The metal chelating agents may be used singly or in combination of two or more.

<<Organic Acid>>

Examples of the organic acids in the film cleaning solution according to the present embodiment include carboxylic acids such as lactic acid (LA), citric acid, malic acid, formic acid, acetic acid, oxalic acid, 2-nitrophenylacetic acid, 2-ethylhexanoic acid, and dodecanoic acid; sugar acids such as ascorbic acid and glucuronic acid; sulfonic acids such as methanesulfonic acid, benzenesulfonic acid, and p-toluenesulfonic acid; phosphate esters and phosphoric acid such as bis(2-ethylhexyl)phosphoric acid.

Among the above, the organic acids in the film cleaning solution according to the present embodiment are preferably carboxylic acids, more preferably hydroxy acids such as lactic acid, citric acid, and malic acid, and still more preferably lactic acid.

The organic acids may be used singly or in combination of two or more.

The film cleaning solution according to the present embodiment preferably contains two or more kinds of metal removing agents.

More specifically, the film cleaning solution according to the present embodiment preferably contains two or more kinds of the metal removing agents selected from the group consisting of the metal chelating agents and the organic acids described above, more preferably contains two or more kinds of the metal removing agents selected from the group consisting of the above-described compound (A1) and the organic acids, and still more preferably contains two or more kinds of the metal removing agents selected from the group consisting of the above-described compound (A1) and carboxylic acids.

Among the above, the film cleaning solution according to the present embodiment preferably contains the above-described metal chelating agents and organic acids, more preferably contains the above-described compound (A1) and organic acids, and still more preferably contains the above-described compound (A1) and carboxylic acids.

The film cleaning solution according to the present embodiment may contain any components other than the solvent and metal removing agents described above within a range that does not impair the effects of the present invention.

Examples of any components include pH adjusters and surfactants.

[Hansen Solubility Parameter of Film Cleaning Solution]

The film cleaning solution according to the present embodiment contains two or more kinds of the solvents described above and the metal removing agents, and a distance between a Hansen solubility parameter of the film cleaning solution and a Hansen solubility parameter of dimethylacetamide is 1.0 or less.

In the film cleaning solution according to the present embodiment, the distance (HSP distance) between the Hansen solubility parameter of the film cleaning solution according to the present embodiment and the Hansen solubility parameter of dimethylacetamide is 1.0 or less, preferably 0.8 or less, and more preferably 0.5 or less.

In a case in which the HSP distance of the film cleaning solution according to the present embodiment is equal to or less than the above preferable values, the film cleaning solution according to the present embodiment can more effectively remove both organic residues and metal impurities regardless of the material of the film.

Here, the "Hansen solubility parameter" is theoretically calculated as a numerical constant and is a useful tool for predicting the ability of a solvent material to dissolve a particular solute.

The Hansen solubility parameters can be a measure of the overall strength and selectivity of a material by combining the following three experimentally and theoretically derived Hansen solubility parameters ($\delta_d$ (dispersion force term), $\delta_p$ (polar term), and $\delta_h$ (hydrogen-bond term)). The units of the Hansen solubility parameters are $MPa^{0.5}$ or $(J/cc)^{0.5}$.

$\delta_d$: Energy derived from intermolecular dispersion force.

$\delta_p$: Energy derived from intermolecular polar force.

$\delta_h$: Energy derived from intermolecular hydrogen bonding force.

The "Hansen Solubility Parameters" can be calculated by, for example, "Molecular Modeling Pro" software, version 5.1.9 (ChemSW, Fairfield CA, www.chemsw.com) or Hansen Solubility from Dynacomp Software.

The film cleaning solution according to the present embodiment is a mixture. Thus, the Hansen solubility parameter of the film cleaning solution according to the present embodiment can be obtained as follows.

For example, a film cleaning solution CS contains a solvent $S^1$ ($\delta_{ds1}$, $\delta_{ps1}$, $\delta_{hs1}$), a solvent $S^2$ ($\delta_{ds2}$, $\delta_{ps2}$, $\delta_{hs2}$), a metal removing agent $B^1$ ($\delta_{dB1}$, $\delta_{pB1}$, $\delta_{hB1}$), and a metal removing agent $B^2$ ($\delta_{dB2}$, $\delta_{pB2}$, $\delta_{hB2}$), and in a case in which a blending amount of the solvent $S^1$ is a, a blending amount of the solvent $S^2$ is b, a blending amount of the metal removing agent $B^1$ is c, and a blending amount of the metal removing agent $B^2$ is d, $\delta_{dcs}$ (dispersion force term), $\delta_{pcs}$ (polar term), and $\delta_{hcs}$ (hydrogen-bond term) of the film cleaning solution CS are calculated by the following Equations. Note that, a+b+c+d is 100.

$$\delta_{dcs} = (\delta_{ds1} \times a + \delta_{ds2} \times b + \delta_{dB1} \times c + \delta_{dB2} \times d)/100$$

$$\delta_{pcs} = (\delta_{ps1} \times a + \delta_{ps2} \times b + \delta_{pB1} \times c + \delta_{pB2} \times d)/100$$

$$\delta_{hcs} = (\delta_{hs1} \times a + \delta_{hs2} \times b + \delta_{hB1} \times c + \delta_{hB2} \times d)/100$$

The distance (HSP distance) between the Hansen solubility parameter of the film cleaning solution CS (film cleaning solution according to the present embodiment) and the Hansen solubility parameter of dimethylacetamide is calculated by Equation (1).

$$\text{HSP distance} = \{4(\delta_{dcs} - \delta_{dDMAc})^2 + (\delta_{pcs} - \delta_{pDMAc})^2 + (\delta_{hcs} - \delta_{hDMAc})^2\}^{0.5} \quad (1)$$

In addition, a value of 16.8 is used for the dispersion force term ($\delta_{dDMAc}$) of dimethylacetamide, a value of 11.5 is used for the polar term ($\delta_{pDMAc}$) of dimethylacetamide, and a value of 9.4 is used for the hydrogen-bond term ($\delta_{hDMAc}$) of dimethylacetamide.

The HSP distance of the film cleaning solution according to the present embodiment can be controlled by, for example, employing a solvent or a metal removing agent which has values close to the values of the dispersion force term ($\delta_{dDMAc}$), the polar term ($\delta_{pDMAc}$), and the hydrogen-bond term ($\delta_{hDMAc}$) of dimethylacetamide or by combining individual components.

<First Film Cleaning Solution>

A film cleaning solution according to a first embodiment contains a mixed solvent of two or more kinds of the solvents selected from the group consisting of ketone-based solvents, ester-based solvents, alcohol-based solvents, and ether-based solvents, and a metal removing agent.

The mixed solvent is more preferably a mixed solvent of one or more kinds of the solvents selected from the group consisting of ketone-based solvents and ester-based solvents (hereinafter, also referred to as a "solvent S1"), and one or more kinds of the solvents selected from the group consisting of alcohol-based solvents and ether-based solvents (hereinafter, also referred to as a "solvent S2"), still more preferably a mixed solvent of an ester-based solvent and an ether-based solvent, and particularly preferably a mixed solvent of a lactone-based solvent and an ether-based solvent.

For example, in a case in which two or more kinds of the solvents in the film cleaning solution according to the present embodiment are mixed solvents of the solvent S1 and the solvent S2, a mixing ratio of the solvent S1 and the solvent S2 (solvent S1:solvent S2) is preferably 20:80 to 80:20, more preferably 30:70 to 70:30, and still more preferably 40:60 to 60:40 by mass.

Examples of suitable combinations of two or more kinds of the solvents in the film cleaning solution according to the present embodiment include a mixed solvent of one or more kinds of the solvents selected from the group consisting of γ-butyrolactone, ε-caprolactone, and γ-valerolactone, and one or more kinds of the solvents selected from the group consisting of EGME, PGME, and PGEE; a mixed solvent of dihydrolevoglucosenone (silene) and PG; and the like.

Among these, the solvent is preferably a mixed solvent of one or more kinds of the solvents selected from the group consisting of γ-butyrolactone, ε-caprolactone, and γ-valerolactone, and one or more kinds of the solvents selected from the group consisting of EGME, PGME, and PGEE, and more preferably a mixed solvent of γ-butyrolactone and PGME.

Specific examples of the metal removing agent in the film cleaning solution according to the present embodiment include metal chelating agents, organic acids, and the like, and any one thereof may be used alone, or two or more thereof may be used in combination.

Contents of the mixed solvent and the metal removing agent in the film cleaning solution according to the present embodiment are appropriately selected so that the above-described HSP distance is 1.0 or less.

The content of the mixed solvent in the film cleaning solution according to the present embodiment is preferably 90% to 99.5% by mass and more preferably 95% to 99% by mass with respect to 100% by mass of the total film cleaning solution.

In addition, the content of the metal removing agent in the film cleaning solution according to the present embodiment is preferably 0.1% to 10% by mass, more preferably 0.5% to 10% by mass, still more preferably 0.5% to 5% by mass, and particularly preferably 1% to 5% by mass with respect to 100% by mass of the total film cleaning solution.

<Second Film Cleaning Solution>

A film cleaning solution according to a second embodiment contains a mixed solvent of two or more kinds of the solvents selected from the group consisting of ketone-based solvents, ester-based solvents, alcohol-based solvents, and ether-based solvents, the metal chelating agent described above, and the organic acid described above.

As a suitable combination of two or more kinds of the solvents in the film cleaning solution of the present embodiment, the same combination as the above-described suitable combination of two or more kinds of the solvents in the film cleaning solution of the first embodiment is used.

The metal chelating agent in the film cleaning solution according to the present embodiment is preferably the compound (A1), and more preferably acetylacetone (AcAc).

The organic acids in the film cleaning solution according to the present embodiment are preferably carboxylic acids, more preferably hydroxy acids such as lactic acid, citric acid, and malic acid, and still more preferably lactic acid.

The contents of the mixed solvent, the metal chelating agent, and the organic acid are appropriately selected so that the above-described HSP distance is 1.0 or less.

The content of the mixed solvent in the film cleaning solution according to the present embodiment is preferably 90% to 99.5% by mass and more preferably 95% to 99% by mass with respect to 100% by mass of the total film cleaning solution.

The content of the metal chelating agent in the film cleaning solution according to the present embodiment is preferably 0.1% to 9% by mass, more preferably 0.5% to 9% by mass, and still more preferably 0.5% to 5% by mass with respect to the total film cleaning solution.

The proportion of the compound (A1) in the metal chelating agent is preferably 50% by mass or more, more preferably 75% by mass or more, and may be 100% by mass with respect to the total mass of the metal chelating agent.

The content of the organic acid in the film cleaning solution according to the present embodiment is preferably 0.1% to 9% by mass, more preferably 0.5% to 9% by mass, and still more preferably 0.5% to 5% by mass with respect to 100% by mass of the total film cleaning solution.

The ratio of the carboxylic acid in the organic acid is preferably 50% by mass or more, more preferably 75% by mass or more, and may be 100% by mass with respect to the total mass of the organic acid.

The film cleaning solution according to the first embodiment and the film cleaning solution according to the second embodiment may further contain any components described above, as necessary.

The film cleaning solution according to the present embodiment is a cleaning solution useful for cleaning films.

Forms and shapes of the films are not particularly limited, and examples thereof include flat films, hollow fiber films, tubular films, spiral films, and thin films (films).

Materials of the films are also not particularly limited, and examples thereof include polyolefins (polyethylene, polypropylene, and the like), polysulfone, polyacrylonitrile, polyimide, polyimide, polyvinyl alcohol, cellulose-based acetate, fluoropolymer, ceramic, and the like.

The film cleaning solution according to the present embodiment is a cleaning solution particularly useful for cleaning films containing polyolefin (particularly polyethylene) and polyimide. That is, the film cleaning solution according to the present embodiment is preferably a polyolefin resin film cleaning solution (particularly a polyethylene resin film cleaning solution) or a polyimide-based resin film cleaning solution. Here, the polyimide-based resin film means a film containing one or more kinds of resins selected from the group consisting of polyamic acid and polyimide.

The film cleaning solution according to the present embodiment as described above contains two or more kinds of the solvents described above and the metal removing agents, and a distance between a Hansen solubility parameter of the film cleaning solution and a Hansen solubility parameter of dimethylacetamide is 1.0 or less.

In the film cleaning solution according to the present embodiment, the Hansen solubility parameter of the entire film cleaning solution is adjusted to be close to DMAc, which is generally used for cleaning polyimide-based films. Thus, the cleanability of the polyimide-based films is favorable.

In addition, although the reason is not clear, the film cleaning solution according to the present embodiment contains the metal removing agent while the Hansen solubility parameter of the entire film cleaning solution is adjusted to be close to DMAc, thereby achieving the favorable cleanability even for non-polar polyethylene-based films, which have properties significantly different from polar polyimide-based films. Furthermore, it is excellent in removability of metal impurities because the metal removing agent is contained.

Therefore, according to the film cleaning solution of the present embodiment, both the organic residues and metal impurities can be removed regardless of materials of a film, such as a polyimide-based film or a polyethylene-based film having properties significantly different therefrom.

(Method for Cleaning Film)

A method for cleaning a film according to the present embodiment is a method for cleaning a film in which the above-described film cleaning solution is brought into contact with the film to clean the film.

As for the film, the same films as those described in the above-described film cleaning solution can be used.

Specific examples of the above-described cleaning step of bringing the film cleaning solution into contact with the film to clean the film include a method for immersing a film in the film cleaning solution described above, and a method for spraying the film cleaning solution described above onto a film.

The cleaning step may be performed only once or may be performed multiple times.

In the cleaning step, the film cleaning solution described above may also be heated, or the cleaning may be carried out at room temperature (for example, 23° C.).

The method for cleaning a film according to the present embodiment may include a drying step of drying the film cleaned in the above-described cleaning step. As the drying step, specifically, known methods such as a method for performing air-drying at room temperature; a method for placing the cleaned film in a constant temperature bath and heating the film; and a method for performing vacuum drying can be applied without limitation.

According to the method for cleaning a film of the present embodiment described above, by using the above-described film cleaning solution, both the organic residues and metal impurities can be easily removed regardless of materials of a film.

In the method for cleaning a film according to the present embodiment, before or after the step of bringing the above-described film cleaning solution into contact with the film to clean the film (hereinafter, also referred to as a "cleaning step A"), a step of bringing a film cleaning solution different from the above-described film cleaning solution into contact with a film to clean the film (hereinafter, also referred to as a "cleaning step B") may be adopted.

That is, the method for cleaning a film according to the present embodiment may include (i) the step of bringing the film cleaning solution different from the above-described film cleaning solution to clean the film and the step of bringing the above-described film cleaning solution into contact with the cleaned film to clean the film, may include (ii) the step of bringing the above-described film cleaning solution into contact with the film to clean the film and the step of bringing the film cleaning solution different from the above-described film cleaning solution into contact with the cleaned film to clean the film, and may include (iii) the step of bringing the film cleaning solution different from the above-described film cleaning solution into contact with the film to clean the film, the step of bringing the above-described film cleaning solution into contact with the cleaned film to clean the film, and furthermore, the step of bringing the film cleaning solution different from the above-described film cleaning solution into contact with the cleaned film to clean the film.

In (iii), the film cleaning solutions different from the above-described film cleaning solution in the cleaning steps before and after the step of bringing the above-described film cleaning solution into contact with the film to clean the film may be the same or different from each other.

Cleaning Step B

Examples of the method for bringing the film cleaning solution different from the above-described film cleaning solution in the cleaning step B into contact with the film to clean the film include the same method as in the cleaning step A described above.

The cleaning step B may be carried out before or after the cleaning step A only once, or may be carried out multiple times.

Film Cleaning Solution Different from Film Cleaning Solution Described Above

Specific examples of the film cleaning solution (hereinafter, also referred to as a "film cleaning solution B") different from the above-described film cleaning solution in the cleaning step B of the method for cleaning a film according to the present embodiment include a film cleaning solution that contains a solvent and does not contain a gold removing agent. Typical examples of the film cleaning solution B include a film cleaning solution consisting of only a solvent.
Film Cleaning Solution B Specific examples of the solvent in the film cleaning solution B include polar solvents such as ketone-based solvents, ester-based solvents, alcohol-based solvents, nitrile-based solvents, amide-based solvents, ether-based solvents, sulfoxide-based solvents, and sulfone-based solvents; and non-polar solvents such as hydrocarbon-based solvents, and specifically, the same solvents as the solvents in the above-described film cleaning solution are exemplary examples.

Among the above, the film cleaning solution B preferably contains an alcohol-based solvent, more preferably contains an alcohol-based solvent having 1 to 5 carbon atoms, and still more preferably contains 2-propanol (isopropyl alcohol).

That is, one embodiment is the method for cleaning a film including the step of bringing the above-described film cleaning solution into contact with a film to clean the film, and a step of bringing an alcohol-based solvent (preferably, 2-propanol) into contact with the film before or after the step of bringing the above-described film cleaning solution into contact with a film to clean the film.

The method for cleaning a film according to the present embodiment may include a drying step of drying the film cleaned in the above-described cleaning step A or cleaning step B. As the drying step, specifically, known methods such as a method for performing air-drying at room temperature; a method for placing the cleaned film in a constant temperature bath and heating the film; and a method for performing vacuum drying can be applied without limitation.

According to the method for cleaning a film of the present embodiment described above, in addition to the above-described cleaning step A, the method for cleaning a film further includes the cleaning step B. Therefore, organic residues and metal impurities adhering to the film can be removed more effectively as compared with the method for cleaning a film including only the above-described cleaning step A.

EXAMPLES

Hereinafter, the present invention will be described in more detail with reference to Examples, but the present invention is not limited thereto.
(Preparation of Film Cleaning Solution)

Each component was mixed at a composition ratio shown in Table 1 to obtain a film cleaning solution in each of Examples.

Abbreviations in the table represent the following compounds.
  n-BA: n-Butanol
  PGME: Propylene glycol monomethyl ether
  PGMEA: Propylene glycol monomethyl ether acetate
  DMAc: Dimethylacetamide
  DMSO: Dimethylsulfoxide
  CH: Cyclohexanone
  GBL: γ-Butyrolactone
  LA: Lactic acid
  AcAc: Acetylacetone In addition, the numerical values in parentheses in Table 1 are blending amounts (% by mass).

TABLE 1

| | Solvent | | | Metal removing agent | |
|---|---|---|---|---|---|
| Comparative Example 1 | | n-BA (100) | | — | |
| Comparative Example 2 | PGME (70) | PGMEA (30) | | — | |
| Comparative Example 3 | DMAc (90) | PGME (10) | | — | |
| Comparative Example 4 | DMSO (45) | PGMEA (55) | | — | |
| Comparative Example 5 | DMSO (44.55) | PGMEA (54.45) | | LA (1.0) | |
| Comparative Example 6 | DMSO (41.96) | PGMEA (47.95) | CH (9.99) | LA (0.10) | |
| Comparative Example 7 | DMSO (41.58) | PGMEA (47.52) | CH (9.90) | LA (1.00) | |
| Example 1 | GBL (47.04) | PGME (50.96) | | LA (1) | AcAc (1) |

[Calculation of HSP Distance]

Example 1

Hansen solubility parameter of each component of the film cleaning solution in Example 1 was calculated by using "Molecular Modeling Pro" software, version 5.1.9 (ChemSW, Fairfield CA, www.chemsw.com). The Hansen Solubility Parameter for each component is shown below.

A value of 18 was used for the dispersion force term ($\delta_{dGBL}$) of GBL, a value of 16.6 was used for the polar term ($\delta_{pGBL}$) of GBL, and a value of 7.4 was used for the hydrogen-bond term ($\delta_{hGBL}$) of GBL.

A value of 15.6 was used for the dispersion force term ($\delta_{dPGME}$) of PGME, a value of 6.3 was used for the polar term ($\delta_{pPGME}$) of PGME, and a value of 11.6 was used for the hydrogen-bond term ($\delta_{hPGME}$) of PGME.

A value of 17 was used for the dispersion force term ($\delta_{dLA}$) of LA, a value of 8.3 was used for the polar term ($\delta_{pLA}$) of LA, and a value of 28.4 was used for the hydrogen-bond term ($\delta_{hLA}$) of LA.

A value of 16.1 was used for the dispersion force term ($\delta_{dAcAc}$) of AcAc, a value of 10 was used for the polar term ($\delta_{pAcAc}$) of AcAc, and a value of 6.2 was used for the hydrogen-bond term ($\delta_{hAcAc}$) of AcAc.

The dispersion force term ($\delta_{dt}$), the polar term ($\delta_{pt}$), and the hydrogen-bond term ($\delta_{ht}$) of the film cleaning solution in Example 1 were obtained as follows.

$$\delta_{dt}=(\delta_{dGBL}\times 47.04+\delta_{dPGME}\times 50.96+\delta_{dLA}\times 1+\delta_{dAcAc}\times 1)/100$$

$$\delta_{pt}=(\delta_{pGBL}\times 47.04+\delta_{pPGME}\times 50.96+\delta_{pLA}\times 1+\delta_{pAcAc}\times 1)/100$$

$$\delta_{ht}=(\delta_{hGBL}\times 47.04+\delta_{hPGME}\times 50.96+\delta_{hLA}\times 1+\delta_{hAcAc}\times 1)/100$$

In addition, the distance (HSP distance) between the Hansen solubility parameter of the film cleaning solution according to Example 1 and the Hansen solubility parameter of dimethylacetamide was calculated by Equation (10.

$$\text{HSP distance}=\{4(\delta_{dt}-\delta_{dDMAc})^2+(\delta_{pt}-\delta_{pDMAc})^2(\delta_{ht}-\delta_{hDMAc})^2\}^{0.5} \quad (1t)$$

In addition, a value of 16.8 was used for the dispersion force term ($\delta_{dDMAc}$) of dimethylacetamide, a value of 11.5 was used for the polar term ($\delta_{pDMAc}$) of dimethylacetamide, and a value of 9.4 was used for the hydrogen-bond term ($\delta_{hDMAc}$) of dimethylacetamide.

Comparative Examples 1 to 7

In the same manner as in Example 1 described above, Hansen solubility parameter of each of film cleaning solutions in Comparative Examples 1 to 7 and a distance between the Hansen solubility parameters of the film cleaning solutions in Comparative Examples 1 to 7 and the Hansen solubility parameter of dimethylacetamide were determined.

Table 2 shows the Hansen solubility parameter of the film cleaning solution in each example and the distance (HSP distance) between the Hansen solubility parameter of the film cleaning solution in each example and the Hansen solubility parameter of dimethylacetamide.

[Evaluation of Film Cleanability]

Non-volatile residues (NVRs) of a polyimide-based porous film (PI film) and a polyethylene-based porous film (PE film) were measured after cleaning with the film cleaning solution in each example to evaluate the film cleanability of the film cleaning solution in each example.

It means that the lower the mass of the non-volatile residues (NVRs), the higher the cleanability of the film cleaning solution for the organic residues.

Specific procedures are as follows.

Cleaning of PI Film

A PI film was produced by a method described in "<Reference Example> Production of Polyimide Porous Film" in Japanese Unexamined Patent Application, First Publication No. 2017-202479. Operations in which 600 cm² of the PI film was immersed in 800 g of the film cleaning solution in each example, stirred, and taken out were repeated three times. The PI film was then immersed in 800 cm³ of isopropyl alcohol for one day. The isopropyl alcohol was then heated until 100 cm³ thereof was evaporated. 100 cm³ of evaporated isopropyl alcohol was then transferred to a platinum dish previously weighed with an electronic balance and heated until the isopropyl alcohol was completely evaporated. After the evaporation treatment, the platinum dish was weighed, and the mass of the non-volatile residues (NVRs) was measured from the difference in weight between the previously weighed platinum dish and the platinum dish with the isopropyl alcohol completely evaporated. The results are shown in Table 2 as "PI NVR (mg/600 cm²)".

Cleaning of PE Film

The mass of the non-volatile residues (NVRs) was measured in the same manner as for cleaning the PI film, except that a PE film (Teijin Limited, trade name: Miraim, 600 cm²) was used. The results are shown in Table 2 as "PE NVR (mg/600 cm²)".

Regarding Reference Example 1

As Reference Example 1, each of the PI film and the PE film was not cleaned with the film cleaning solution, but the same procedure as the above-described cleaning of the PI film and the above-described cleaning of the PE film was performed, and "PI NVR (mg/600 cm²)" and "PE NVR (mg/600 cm²)" were measured. The results are shown in Table 2.

TABLE 2

| | HSP | | | HSP distance | PI NVR (mg/600 cm²) | PE NVR (mg/600 cm²) |
| --- | --- | --- | --- | --- | --- | --- |
| | $\delta_d$ | $\delta_p$ | $\delta_h$ | | | |
| Reference Example 1 | — | — | — | — | 3.35 | 18.83 |
| Comparative Example 1 | 15.80 | 3.70 | 6.30 | 8.63 | 2.98 | 2.02 |
| Comparative Example 2 | 15.60 | 6.09 | 11.06 | 6.15 | 1.67 | <0.18 |
| Comparative Example 3 | 16.68 | 10.98 | 9.62 | 0.61 | <0.18 | 7.04 |
| Comparative Example 4 | 16.86 | 10.85 | 9.98 | 0.88 | 1.53 | 3.57 |
| Comparative Example 5 | 16.99 | 10.41 | 9.52 | 1.31 | 3.94 | 11.07 |
| Comparative Example 6 | 16.83 | 11.05 | 9.89 | 1.20 | 2.82 | 8.72 |
| Comparative Example 7 | 16.84 | 10.43 | 10.16 | 1.16 | 2.57 | 9.67 |
| Example 1 | 16.75 | 11.20 | 9.74 | 0.46 | 0.22 | 0.88 |

As shown in Table 2, it was confirmed that values of "PI NVR (mg/600 cm²)" and "PE NVR (mg/600 cm²)" of the film cleaning solutions in Examples were lower than those of the film cleaning solutions in Comparative Examples. According to this, it was confirmed that the film cleaning solutions in Examples removed organic residues regardless of the material of the film.

[Evaluation of Calcium Removability]

A PI film was produced by a method described in "<Reference Example> Production of Polyimide Porous Film" in Japanese Unexamined Patent Application, First Publication No. 2017-202479. The PI film was immersed in the film cleaning solution in each example (Example 1, Comparative Examples 1 to 3, and 5 to 7), and the amount of calcium before and after immersion was measured by using an inductively coupled plasma mass spectrometer (manufactured by Agilent Technologies, Inc., trade name: ICP-MS 8900).

It means that the larger the amount of calcium, the higher the calcium removability of the film cleaning solution.

Specific procedures are as follows.

30 g of the film cleaning solution in each example was prepared, and the amount of calcium in the film cleaning solution in each example (before the PI film was immersed) was measured by using the inductively coupled plasma mass spectrometer.

The PI film was then immersed in 800 g of the film cleaning solution in each example described above for one day.

Each PI film was then taken out, and the amount of calcium in the film cleaning solution in each example was measured by the same method as described above.

In Table 3, a value obtained by subtracting the amount of calcium in the film cleaning solution after immersion of the PI film from the amount of calcium in the film cleaning solution before immersion of the P1 film is shown as "Amount of calcium (ppb)".

Regarding Reference Example 2

As Reference Example 2, "Amount of calcium (ppb)" was measured in the same manner as described above, except that hydrochloric acid (10% HCl) was used. The results are shown in Table 3.

Regarding Reference Example 3

As Reference Example 3, "Amount of calcium (ppb)" was measured in the same manner as described above, except that isopropyl alcohol (IPA) was used. The results are shown in Table 3.

TABLE 3

|  | Amount of calcium (ppb) |
| --- | --- |
| Reference Example 2 (10% HCl) | 3.68 |
| Reference Example 3 (IPA) | 0.01 |
| Comparative Example 1 | 0.03 |
| Comparative Example 2 | 0.21 |
| Comparative Example 3 | 0.36 |
| Comparative Example 5 | 3.09 |
| Comparative Example 6 | 0.00 |
| Comparative Example 7 | 1.39 |
| Example 1 | 6.07 |

As shown in Table 3, it was confirmed that the film cleaning solutions in Examples had a larger amount of calcium than the film cleaning solutions in Comparative Examples, and calcium adhering to the PI film could be more included in the film cleaning solution, that is, could be removed from the PI film.

In addition, it was confirmed that the film cleaning solutions in Examples were superior to hydrochloric acid, which is generally used as a metal removing agent for films, in calcium removability.

<<Evaluation of Metal Removability>>

A PI film was produced by a method described in "<Reference Example> Production of Polyimide Porous Film" in Japanese Unexamined Patent Application, First Publication No. 2017-202479. The metal removability in the case of cleaning the PI film with the film cleaning solution in Example 1 described above was evaluated.

Specific procedures are as follows.

[Measurement (1) of Metal Extraction Amount]

0.1 $m^2$ of the PI film was immersed in 100 $cm^3$ of the film cleaning solution in Example 1 for one day at room temperature (23° C.). Next, the entire film cleaning solution was removed, and after the solvent was replaced twice with OK73 thinner (manufactured by TOKYO OHKA KOGYO CO., LTD.), the P1 film was immersed in 100 $cm^3$ of OK73 thinner at room temperature for one day. Next, the PI film was taken out, and the amount of metals in the OK73 thinner was measured by using an inductively coupled plasma mass spectrometer (manufactured by Agilent Technologies, Inc., trade name: ICP-MS 8900). The measured metals are Li, Na, Mg, Al, K, Ca, Ti, V, Cr, Mn, Fe, Co, Ni, Cu, Zn, Ge, As, Sr, Zr, Mo, Ag, Cd, Sn, Sb, Ba, W, Au, and Pb. In addition, the step of bringing the PI film into contact with OK73 thinner is a step necessary for measuring the amount of extracted metals, and is not a step intended to clean the PI film.

Furthermore, as a blank test, 0.1 $m^2$ of the PI film was cleaned twice with OK73 thinner (manufactured by TOKYO OHKA KOGYO CO., LTD.) without cleaning with the film cleaning solution and then immersed in 100 $cm^3$ of OK73 thinner for one day at room temperature, and the amount of metals was also measured.

In this case, it means that the lower the amount of metals measured as compared with the amount of metals in the blank test, the lower the amount of metals remaining in the film, and it means that the removability of metals was high.

Table 4 shows the amount of calcium and the total amount of metals in the results.

TABLE 4

|  | Amount of calcium (ppb) | Total amount of metals (ppb) |
| --- | --- | --- |
| Blank test | 0.164 | 15.992 |
| Example 1 | 0.033 | 8.267 |

As shown in Table 4, it was confirmed that the film cleaning solutions in Examples had a small total amount of calcium and metal, and were able to remove more metals adhering to the PI film.

[Measurement (2) of Metal Extraction Amount]

In addition to the step of cleaning the PI film with the film cleaning solution in Example 1 described above, a method for cleaning a film including the step of cleaning a film with isopropyl alcohol was evaluated for metal removability.

Specific procedures are as follows.

Evaluation of Metal Removability of Method X for Cleaning Film

A method X for cleaning a film includes the steps of cleaning the PI film with the film cleaning solution in Example 1 and a step of further cleaning the PI film cleaned with the film cleaning solution of Example 1 with isopropyl alcohol.

Specifically, 0.1 $m^2$ of the PI film was immersed in 100 $cm^3$ of the film cleaning solution in Example 1 for one day at room temperature (23° C.). Next, the film cleaning solution in Example 1 was completely removed, and the operations of immersing the film in 100 $cm^3$ of isopropyl alcohol, stirring, and taking out the film were repeated four times. Next, the entire isopropyl alcohol was removed, and the PI film was immersed in 100 $cm^3$ of OK73 thinner for one day at room temperature. The PI film was taken out, and the amount of metals in the OK73 thinner was measured in the same manner as in [Measurement (1) of Metal Extraction Amount] described above.

Among the results, the total amount of calcium and metals is shown in Table 5 as "Method X for cleaning film".

Evaluation of Metal Removability of Method Y for Cleaning Film

A method Y for cleaning a film includes a step of cleaning the PI film with isopropyl alcohol, a step of further cleaning the PI film that has been cleaned with isopropyl alcohol with the film cleaning solution in Example 1, and a step of further cleaning the PI film that has been cleaned with the film cleaning solution in Example 1 with isopropyl alcohol.

Specifically, the operations of immersing 0.1 m$^2$ of the PI film in 100 cm$^3$ of isopropyl alcohol, stirring, and taking out the PI film were repeated four times. Next, the PI film was immersed in 100 cm$^3$ of the film cleaning solution in Example 1 for one day at room temperature (23° C.). Next, the film cleaning solution in Example 1 was completely removed, and the operations of immersing the film in 100 cm$^3$ of isopropyl alcohol, stirring, and taking out the film were repeated four times. Next, the entire isopropyl alcohol was removed, and the PI film was immersed in 100 cm$^3$ of OK73 thinner for one day at room temperature. The PI film was taken out, and the amount of metals in the OK73 thinner was measured in the same manner as in [Measurement (1) of Metal Extraction Amount] described above.

Among the results, the total amount of calcium and metals is shown in Table 5 as "Method Y for cleaning film".

TABLE 5

|  | Amount of calcium (ppb) | Total amount of metals (ppb) |
| --- | --- | --- |
| Method X for cleaning film | 0.021 | 0.742 |
| Method Y for cleaning film | 0.011 | 0.376 |

As shown in Tables 4 and 5, in the method for cleaning a film with the film cleaning solution in Example 1, it was confirmed that the metals adhering to the PI film could be further removed by employing the step of further cleaning the PI film with isopropyl alcohol before or before and after the step of cleaning the film with the film cleaning solution in Example 1.

Although the preferable examples of the present invention have been described above, the present invention is not limited to these examples. Configurations can be added, omitted, replaced, and other modifications can be made without departing from the spirit of the present invention. The present invention is not limited by the above description, but only by the scope of the appended claims.

What is claimed is:

1. A film cleaning solution consisting of:
a solvent; and
a metal removing agent,
wherein the film cleaning solution contains γ-butyrolactone and solvents other than γ-butyrolactone,
the metal removing agent contains at least one selected from the group consisting of a metal chelating agent and an organic acid, and
a distance between a Hansen solubility parameter of the film cleaning solution and a Hansen solubility parameter of dimethylacetamide is 1.0 or less.

2. The film cleaning solution according to claim 1, wherein the distance between the Hansen solubility parameter of the film cleaning solution and the Hansen solubility parameter of dimethylacetamide is 0.5 or less.

3. The film cleaning solution according to claim 1, the film cleaning solution comprising two or more kinds of the metal removing agents.

4. The film cleaning solution according to claim 1, wherein the metal removing agent contains a compound (A1) represented by General Formula (a-1):

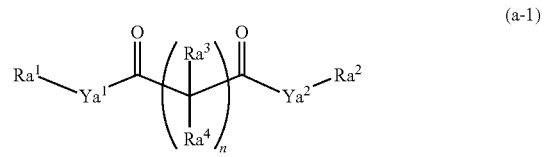

(a-1)

wherein Ra$^1$ and Ra$^2$ are each independently an alkyl group having 1 to 3 carbon atoms,
Ra$^3$ and Ra$^4$ are each independently a hydrogen atom or an alkyl group having 1 to 3 carbon atoms,
Ya$^1$ and Ya$^2$ are each independently a single bond, —O—, —S—, or —N(Ra$^5$)—, Ra$^5$ is a hydrogen atom or an alkyl group having 1 to 3 carbon atoms, and n is an integer of 0 to 3.

5. The film cleaning solution according to claim 1, wherein the metal removing agent contains an organic acid.

6. The film cleaning solution according to claim 5, wherein the organic acid is a carboxylic acid.

7. A method for cleaning a film, comprising bringing the film cleaning solution according to claim 1 into contact with a film to clean the film.

8. The method for cleaning a film according to claim 7, wherein the film contains polyimide or polyethylene.

9. The method for cleaning a film according to claim 7, comprising, before or after bringing the film cleaning solution into contact with the film to clean the film, bringing the film into contact with another film cleaning solution different from the film cleaning solution to clean the film.

10. The method for cleaning a film according to claim 9, wherein the another film cleaning solution different from the film cleaning solution contains an alcohol solvent.

* * * * *